United States Patent [19] [11] 4,182,535
Fannin [45] Jan. 8, 1980

[54] TRAILER BRAKE SYSTEM
[75] Inventor: Richard C. Fannin, Grafton, Ohio
[73] Assignee: The Bendix Corporation, Southfield, Mich.
[21] Appl. No.: 943,587
[22] Filed: Sep. 18, 1978
[51] Int. Cl.² .............................................. B60T 13/38
[52] U.S. Cl. ......................................... 303/9; 303/29; 303/71
[58] Field of Search ...................... 303/6 M, 9, 71, 13, 303/7, 28–30, 40; 188/170

[56] References Cited
U.S. PATENT DOCUMENTS

| | | |
|---|---|---|
| 3,862,782 | 1/1975 | Horowitz et al. ................. 303/30 X |
| 3,992,064 | 11/1976 | Carton et al. ............................ 303/7 |
| 4,042,281 | 8/1977 | Ury .................................... 303/71 X |

Primary Examiner—Douglas C. Butler
Attorney, Agent, or Firm—Ken C. Decker; W. N. Antonis

[57] ABSTRACT

A fluid pressure braking system for the trailer portion of a tractor-trailer combination vehicle includes valving mechanism which permits the vehicle spring applied, fluid pressure released parking brakes to be released after a single brake system failure. The system requires a pair of fluid pressure reservoirs, and includes the necessary interlock to permit both of the reservoirs to be charged while protecting the reservoirs in case of a leak in the system. The system also permits the vehicle parking brakes to be charged with the fluid pressure stored in either of the reservoirs. Both of the reservoirs normally provide the fluid pressure to actuate the vehicle service brakes.

9 Claims, 1 Drawing Figure

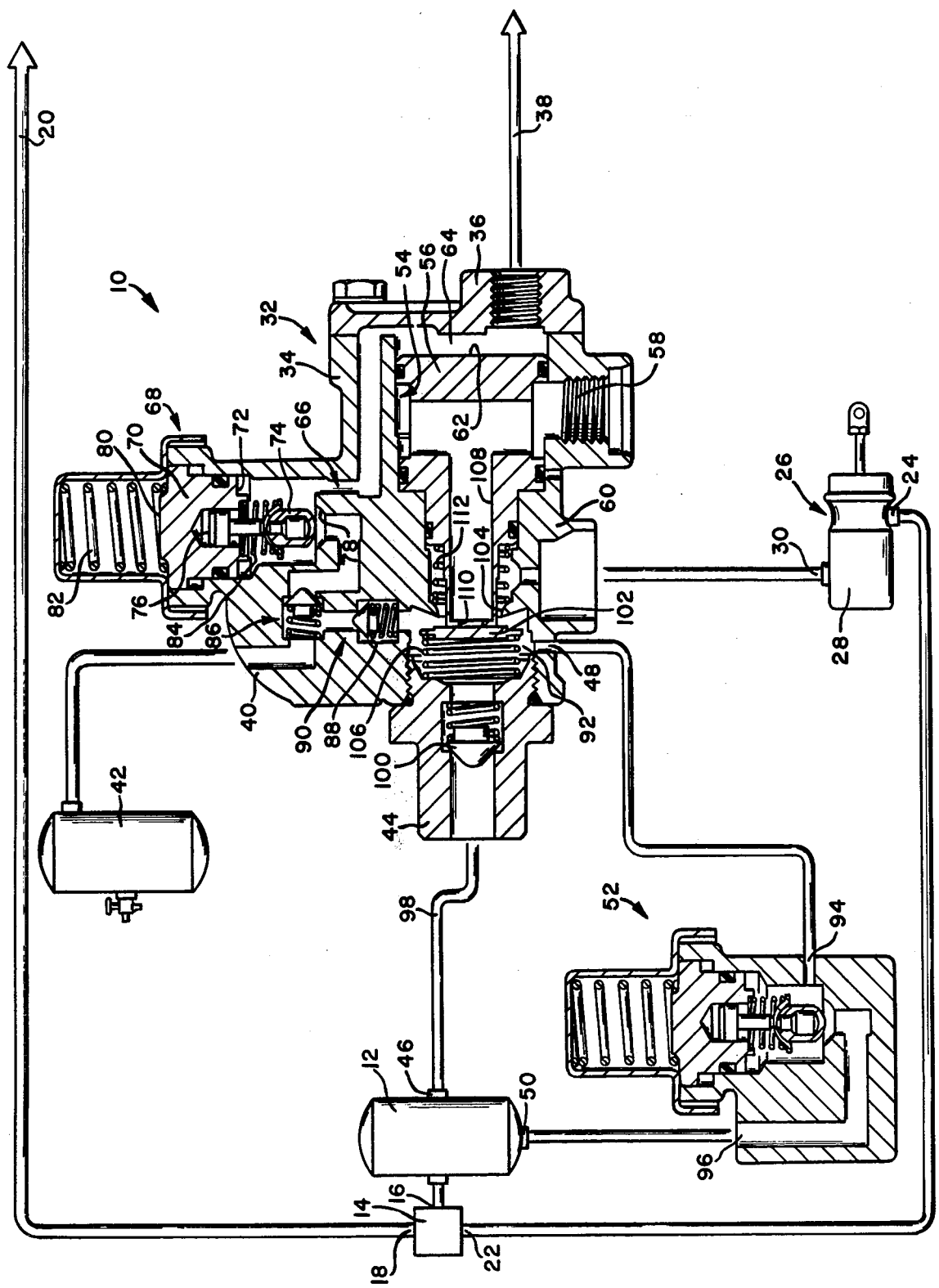

TRAILER BRAKE SYSTEM

BACKGROUND OF THE INVENTION

This invention relates to a fluid pressure braking system having a pair of reservoirs, and valving mechanism which controls communication of fluid pressure to the reservoirs, protects the reservoirs in case of a leak in the system, and is capable of communicating either of the reservoirs to the spring applied, fluid pressure released parking brakes on the vehicle so that the parking brakes can always be released after a single failure of the vehicle service brake system.

To meet Federal regulations, vehicle manufacturers have heretofore used a trailer fluid pressure braking system having three reservoirs. Two service reservoirs were needed to supply the required volume for the service braking system. A third reservoir was required to provide an isolated source of fluid pressure which could be used to release the vehicle spring applied, fluid pressure released parking brakes upon a failure of the service brake system. A revised interpretation of this regulation does not require that the parking brake release pressure be supplied from an isolated source if the parking brakes can be released at least once after a single service brake system failure. Accordingly, the present invention proposes a trailer fluid pressure braking system having but two service reservoirs, but which also includes appropriate valving and interlocks to isolate the reservoirs from one another so that a single service failure will deplete, at most, only one of the reservoirs, and also includes appropriate valving to communicate either of the reservoirs to the trailer spring applied, fluid pressure released parking brakes so that the latter may be released if any one of the reservoirs has failed.

SUMMARY OF THE INVENTION

Therefore, an important object of my invention is to provide a fluid pressure braking system for the trailer portion of a tractor-trailer combination vehicle which includes but two reservoirs interconnected in such a manner that the vehicle mechanically applied, fluid pressure released parking brakes may always be released at least once after they have been applied due to a single failure in the vehicle service braking system.

Another important object of my invention is to provide a fluid pressure braking system for the trailer portion of a tractor-trailer combination vehicle in which the emergency brakes do not apply automatically in response to a service system failure.

Another important object of my invention is to provide a braking system in which the vehicle fluid pressure released parking brakes can always be released at least once after they are applied manually in order to stop the vehicle after a single service system failure.

Still another important object of my invention is to provide a fluid pressure braking system in which the service braking system cannot be charged if there is a failure in the parking brake circuit.

DESCRIPTION OF THE DRAWINGS

The sole FIGURE of the drawings is a schematic illustration of a vehicle braking system made pursuant to the teachings of my present invention, with the various control valves used therein illustrated in cross section.

DETAILED DESCRIPTION

Referring now to the drawing, a fluid pressure braking system for the trailer portion of a tractor-trailer combination vehicle generally indicated by the numeral 10 includes a reservoir 12 which mounts a conventional relay valve (or adaptive braking modulator) 14 having a supply port 16 which communicates with the reservoir 12. The relay valve 14 further includes a control port 18 which communicates with the service brake line 20 which is connected with the tractor portion of the vehicle. As is well known to those skilled in the art, the service line 20 is connected to the brake valve which is operated by the vehicle operator, so that when a brake application is effected, a pressure signal is communicated through the service line 20 to the control port 18 of the relay valve 14. When such a braking pressure signal is communicated to the control port 18, the conventional relay valve 14 connects the supply port 16 with the delivery port 22 of the relay valve 14, thereby communicating the fluid pressure content of the reservoir 12 with the service port 24 of a tandem brake actuator generally indicated by the numeral 26. Tandem brake actuators of the type generally indicated by the numeral 26 are conventional, and include a service braking portion which communicates with the port 24 to effect a conventional service brake application. Tandem brake actuator 26 further includes a spring chamber 28, which houses a relatively large spring which is capable of effecting a parking brake application. Hold-off pressure is communicated to the spring chamber 28 through the port 30. In the absence of hold-off pressure, the spring actuator effects a brake application, but when hold-off pressure is communicated to the port 30, the spring actuator is "held off", to thereby release the parking brake.

System 10 further includes a valve mechanism generally indicated by the numeral 32 comprising a housing 34 having an inlet port 36 connected to the supply line 38. As is well known to those skilled in the art, supply line 38 is communicated to a source of fluid pressure, such as an air compressor, on the tractor portion of the vehicle. Valve mechanism 32 further includes a port 40 which is communicated to a second reservoir 42, an inlet port 44 communicated with the reservoir 12 through port 46 on the reservoir 12, and a port 48 communicated to still another port 50 on the reservoir 12 through a conventional pressure protection valve generally indicated by the numeral 52.

Housing 34 defines a stepped bore 54 therewithin which slidably receives a correspondingly stepped relay piston 56. An exhaust port 58 communicates the larger portion of the bore 54 with the ambient atmosphere, and an outlet port 60 communicates the smaller portion of the bore 54 with hold-off port 30 of the tandem brake actuator 26. Piston 56 includes a face 62 which cooperates with the walls of the housing 34 to define a chamber 64 which is communicated with the port 36 and also with a flow path 66 which communicates the chamber 64 with the reservoir 42. A pressure protection valve generally indicated by the numeral 68, which may be similar to the pressure protection valve 52, is located in the flow path 66. The pressure protection valve 68 is conventional, and includes a fluid pressure responsive piston 70 having an annular face 72 which is exposed to the fluid pressure level in the flow path 66. A valve member 74 is carried by the piston 70 through a lost motion connection generally indicated by the numeral 76, and is adapted to cooperate with a valve seat 78 in the flow path 66. The face 80 of the piston 70 opposite the face 72 is exposed to atmospheric pressure, and a spring 82 bears against the face 80 to thereby urge the piston 70, and therefore the valve element 74, downwardly viewing the FIGURE. Of course, when this occurs, the valve element 74 is brought into sealing engagement with the valve seat 78. The stroke of the piston 70 is such that it is sufficiently long that the lost motion connection 76 and the valve spring 84 are able to maintain the valve element 74 in sealing engagement with valve seat 78. Accordingly, when the fluid pressure in the flow path 66 is sufficient such that the force of the fluid pressure acting against the face 72 of the piston 70 is enough to overcome the force of the spring 82, the piston 70 is urged upwardly viewing the FIGURE into the position illustrated in the drawing, thereby moving the valve element 74 away from the seat 78 to permit substantially uninhibited fluid communication through the flow path 66. On the other hand, when the pressure in the flow path 66 drops such that the force of fluid pressure acting against the face 72 is less than the force exerted on the piston 70 by the spring 82, the spring 82 forces the piston 70 downwardly viewing the FIGURE, thereby bringing the valve element 74 into sealing engagement with the valve seat 78. A check valve 86 is located in the flow path 66 between the protection valve 68 and the reservoir 42, and permits fluid communication into the reservoir 42, but prevents fluid communication from the reservoir 42 toward the chamber 64.

A second flow path communicates the reservoir 42 with the reservoir 12 and includes a check valve 88 which permits communication from the reservoir 42 or the chamber 64 into the second flow path 90 but prevents communication in the reverse direction; a valve chamber 92; and the pressure protection valve 52 which is similar to the pressure protection valve 68 and operates in a similar manner to permit communication between the inlet port 94 and the outlet port 96 thereof when the pressure level at the inlet 94 is above a predetermined pressure level, and to prevent communication between the ports 94 and 96 when the pressure level at port 94 drops below the predetermined pressure level. Since the pressure protection valve 52 is almost identical to the pressure protection valve 68, it will not be described in detail herein. A third flow path 98 communicates the reservoir 12 with the chamber 92. A check valve 100 permits fluid communication from the reservoir 12 into the chamber 92, but prevents communication in the reverse direction.

A valve element 102 is disposed within the chamber 92, and is urged toward an annular valve seating area 104 on the housing 32 by a spring 106. The piston 56 defines a passage 108 therewithin, which communicates through an opening 110 in the leftwardmost face of the piston 56 viewing the FIGURE. A spring 112 urges the piston 56 to the right viewing the FIGURE, so that when the chamber 64 is exhausted, the spring 112 urges the opening 110 away from the valve element 102, permitting the spring 106 to urge the valve element 102 into sealing engagement with the valve seat 104. Since the stroke of the piston is sufficient such that the spring can move the opening 110 away from the valve element 102, the port 60 on the valve housing 32, and therefore the hold-off port 30 of the tandem brake actuator 26, is vented to the atmospheric port 58 through the passage 108. However, when pressure is available in the chamber 64, the piston 56 moves to the left viewing the FIGURE, thereby sealingly engaging the opening 110 with the valve element 102 to block communication to the port 58, and thereby thereafter urging the element 102 away from the valve seat 104, thereby communicating the hold-off port 30 of the tandem brake actuator 26 with the chamber 92.

MODE OF OPERATION

When the vehicle is parked and the air exhausted from the system, the spring 112 urges the piston 56 rightwardly viewing the FIGURE, to thereby permit the valve element 102 to close against the seat 104 and to also vent the hold-off port 30 to the atmospheric vent 58 through the passage 108 within the piston 56. Of course, the pressure protection valves 68 and 52 will be closed, since air is exhausted from the system. When the vehicle is started and the air reservoirs 42 and 12 are to be charged, air is communicated through the supply line 38 to the chamber 64, to thereby urge the piston 56 to the left viewing the drawing, thereby initiating communication between the hold-off port 30 and the air pressure level in the chamber 92. At the same time, of course, pressure building up in the first flow path 66 acts on the face 72 of the piston 70, to thereby open the pressure regulating valve 68 to permit fluid to communicate to the reservoir 42 and thereby charge the reservoir. Also, fluid pressure will be communicated through the second flow path 90 through the control chamber 92 and the regulating valve 52 to charge the reservoir 12. Of course, movement of the piston to the left viewing the FIGURE communicates the hold-off port 30 with the chamber 92, to permit the spring pressure applied, fluid pressure released brakes 28 to be released. When the reservoirs 42 and 12 are fully charged, the spring actuator 28 is fully released, and the vehicle may be moved. When a service brake application is effected, the pressure impulse is transmitted through the service line to the control port 18 of relay valve 14, thereby communicating the service portion of the tandem actuator 26 with the fluid pressure in the reservoir 12, to thereby effect a service brake application. In case a failure occurs in the service braking system, the spring brakes can be repeatedly applied and released by controlling communication through the supply line 38. Appropriate controls are normally provided in the vehicle cab to vent the supply line 38, to thereby apply the spring brakes, when the vehicle is parked or when the service braking system malfunctions.

Any failure occurring in the reservoir 12, due to leakage or repeated service brake applications which deplete the content of the reservoir 12 before it can be recharged through the supply line, will also partially fall the reservoir 42, down to the pressure level at which the valve 52 closes. Closure of the valve 52 will trap a predetermined fluid pressure level in the reservoir 42. It is noted that this pressure cannot escape to the chamber 64, because of the check valve 86, and cannot escape into the reservoir 12 because of the check valve 100, which prevents communication through the third flow path 98, and because of the pressure protection valve 52, which permits communication to the leak point at the reservoir 12 through the second flow path 90. This pressure level trapped in the reservoir 42 due to the closure of the regulating valve 52 is sufficient to maintain the spring brake actuator 28 in its released condition. In case of such a failure of the reservoir 12, fluid pressure may communicate from the reservoir 42 to the actuator 28 through the check valve 88, chamber 92, and the bore 54 to the port 60. The reservoir 42 can be recharged in this failure mode through the supply line 38, since pressure may be communicated past the open protection valve 68 and the check valve 86. Accordingly, the spring brake actuators may be repeatedly applied and released when the reservoir 12 fails.

Any failure of the reservoir 42 will reduce the pressure in the trailer supply line 38, since the fluid pressure is communicated through the leak point in the failed reservoir 42. When this occurs, the pressure protection valve 68 closes, but the full pressure level is retained in the reservoir 12, because the check valve 88 prevents backflow to the failed reservoir 42. Since the pressure protection valve 68 has closed, a pressure supply at the closure pressure of the protection valve 68 is available to maintain the piston 56 in its leftwardmost position, thereby maintaining communication between the chamber 92 and the port 60. The full pressure in reservoir 12, therefore, can be communicated through the third flow path 98 into the hold-off port 30 of the tandem brake actuator 26. In this mode, the spring brakes 28 can be applied and released at least once, even after a full service actuation, since the pressure level in the reservoir 12 is retained. However, of course, the reservoir 12 cannot be recharged in this failure mode.

When a failure exists in the parking brake circuit, such as the failure of the hose communicating the port 60 with the port 30 or a failure within the brake actuator itself, any fluid pressure that can pass through the valve 68 will pass through the chamber 92 to the port 60 (the pressure in chamber 64 maintains the piston in the leftwardmost position illustrated in the drawing) will communicate through the port 60 and through the failure point. No air can be supplied to the reservoir 12, because the pressure in chamber 92 will leak through the failure point, thereby keeping the valve 52 closed, and, of course, the check valve 100 prevents communication of air from the chamber 92 to the port 46 of the reservoir 12. Accordingly, no fluid pressure can be supplied to the reservoir 12, so the trailer would have no service brakes and could not be moved because the parking brakes remain applied. The reservoir 42 may receive a relatively small charge, but it cannot communicate with the supply port 16 of the relay valve 14.

I claim:

1. In a vehicle fluid pressure braking system having service brakes actuated by fluid pressure and mechanically applied, fluid pressure released parking brakes, a source of fluid pressure, a pair of reservoirs for storing fluid under pressure, a first flow path communicating said fluid pressure source to one of said reservoirs, a second flow path communicating said one reservoir with the other reservoir, pressure responsive valve means in said second flow path for permitting substantially uninhibited fluid communication to said other reservoir when the pressure level in said second flow path is above a predetermined level but closing to prevent communication through said second flow path when the pressure level therein is below said predetermined level, and a third flow path communicating said other reservoir with said second flow path and bypassing said pressure responsive valve means, check valve means in said third flow path permitting communication from said other reservoir but preventing communication into said other reservoir, and valve means for controlling communication between said reservoirs and said parking brakes.

2. The invention of claim 1:
wherein said valve means controlling communication between said reservoirs and said parking brakes controls communication between said parking brakes and a portion of said second flow path between said one reservoir and said pressure responsive valve means.

3. The invention of claim 2:
wherein operation of said valve means controlling communication between said reservoirs and said parking brakes is controlled by the fluid pressure level in said first flow path.

4. The invention of claim 2:
wherein check valve means in said second flow path permit communication from said one reservoir to the other reservoir, but prevent communication in the reverse direction.

5. The invention of claim 4:
wherein said third flow path communicates with said portion of said second flow path.

6. The invention of claim 2:
wherein said third flow path communicates with said portion of said second flow path.

7. The invention of claim 2:
and pressure responsive valve means in said first flow path for permitting substantially uninhibited fluid communication through said first flow path when the pressure level in said first flow path is above a predetermined level but closing to prevent communication through said first flow path when the pressure level therein is below said predetermined fluid level.

8. The invention of claim 7:
wherein said first flow path includes check valve means located between said one reservoir and said pressure responsive valve means to permit communication through said first flow path into said one reservoir but to prevent communication in the reverse direction.

9. The invention of claim 2:
and valve means controlling communication between said other reservoir and said service brakes, and means for providing a pressure signal to said last mentioned valve means to control communication between said other reservoir and said service brakes.

* * * * *